July 22, 1958 — F. WANKEL — 2,844,422
PISTON RING
Filed Dec. 5, 1956 — 2 Sheets-Sheet 1

INVENTOR
*Felix Wankel*

BY *Thomas, Weisman & Russell*
ATTORNEYS

July 22, 1958
F. WANKEL
PISTON RING
2,844,422

Filed Dec. 5, 1956
2 Sheets-Sheet 2

INVENTOR
*Felix Wankel*

BY *Thomas, Weisman & Russell*
ATTORNEYS

United States Patent Office 2,844,422
Patented July 22, 1958

2,844,422
PISTON RING

Felix Wankel, Lindau, Germany, assignor, by mesne assignments, to Rand-Goetze Corporation, Cleveland, Ohio, a corporation of Ohio Application December 5, 1956, Serial No. 626,398

5 Claims. (Cl. 309—44)

This invention relates to a piston sealing ring of rather general utility but particularly useful as a piston compression ring for internal combustion engines. This application is a continuation-in-part of my application, S. N. 524,491, filed July 26, 1955, entitled "Piston Sealing Device." More specifically described, the ring of this invention is one of L-shape, cross-sectional configuration, the top of the L on that portion positioned adjacent the surface of the cylinder wall being relatively thin, resilient and adapted to contact the cylinder wall in sealing relationship under the influence of combustion gases under pressure. The piston ring of this invention might be further briefly described as being a two-part ring, one part comprising the L-shape or flange configuration just referred to and the other part including one or more expansion rings closely interfitted in appropriate grooves in the base portion of the flange ring. Having the inherent advantages to be described, the piston ring of this invention is adaptable for use in both four and two cycle engines. In both instances, it functions with superior results as a compression ring and may, on the other hand, be utilized as an oil ring. The principle of construction herein described is applicable to rings for other specific purposes, such as piston rod or pump plunger packing rings.

The most common form of piston ring in general usage today is one of square or rectangular cross section. These are located in ring grooves which, comparatively speaking, are of considerably large dimension; hence, substantial back and side clearances are involved. As is well known, such rings are fabricated of iron, steel or other alloys which have sufficient inherent resiliency to obtain a spring loading of the ring. In other words, such rings are better described as tension rings, the spring loading always thrusting the exterior surface of the ring against the cylinder wall. This type of ring, in a comparatively expensive operation, must be precision ground around its external periphery in order to obtain efficient sealing with the cylinder wall.

Because these commonly used expansion rings are located in ring grooves of considerably greater dimension, there has been, and is, a problem of two aspects: that of so-called "fluttering" and that of "blow-by," a direct consequence of ring flutter. Both problems arise as a result of the actual performance of this type of ring under the strain of engine operation where the speeds involved may vary from 5000 to 8500 r. p. m. Although occurring to a lesser degree at lower speeds, such rings, during the down stroke of the piston, and particularly during the compression down stroke, are caused to shift and strike against the opposite side wall of these comparatively large ring grooves. There is also a substantial back clearance, in addition to the side clearances just referred to. Such substantial clearances materially contribute to the continuous chatter or flutter which is incidental to the rapid reciprocatory movement of the ring at the speeds mentioned. And ring flutter permits the gases under pressure to by-pass around the back of the ring, by exit through the side clearances and through the back clearance just referred to. This is the inherent disadvantage of this type of ring known as "blow-by."

Certain types of L-shaped rings have also been tried in internal combustion engines. But these have never reached any practical value in the art because, being in one piece, either a divided piston had to be used to install them or the skirt comprising the main lower portion of the ring had to be serrated or notched in order to permit manufacture of the ring. Furthermore, such so-called flange rings of the prior art have never been successful because the design of same has been such as to permit gas pressure to blow-by behind the ring. Because of the small strength of the radial leg, such rings were not wobble safe and were inclined to wear quickly. The tilting possibility of the radial leg in the groove prevented a good contact fit of the L-ring so that by-passing of the combustion gases behind the piston ring was not substantially avoided.

Both the ordinary type of the expansion ring as it is used today, as well as L-shaped devices heretofore suggested, are subject to a further inherent disadvantage overcome by the instant invention. The expansion ring is loosely held within its groove and, hence, there is considerable difficulty in the transmission of piston heat through the ring to the relatively cool cylinder wall. Similarly, the type of L-ring that has been referred to in the foregoing still presents the problem of relatively large clearances in the ring groove adapted to receive it, and this relatively loose contact with the piston also obviously reduces transmission of heat to the cylinder wall to an undesirable degree.

My invention is based upon recognition of the fact that it is possible and feasible to fabricate a piston ring of the type here under consideration which comprises two parts: one, a relatively thin, flexible, contacting flange ring, and the other part comprising one or more carrier or expansion rings. The combination unit is made in such a way that not only is the contact flange of the piston ring extremely pliable with consequent additional sealing effect responsive to the pressures encountered but, further, it is secured against wobbling without the stated resultant disadvantages of undue blow-by and fluttering.

Accordingly, it is a primary object of this invention to provide a two-part L-shaped (in cross section) sealing ring which, subject to comparatively high gas pressures, functions to compress the resilient and extended flange part thereof against the cylinder wall, thus creating a much more effective and tighter seal than that obtained by similar devices utilized in the past.

It is a further object of the invention to construct a device of the nature herein described which, although being a two-part unit and employing expansion rings, is so designed as to substantially eliminate fluttering during high speed operation thereof and consequently to also eliminate so-called blow-by.

Another objective of this invention is to provide a sealing ring of the described type, particularly a compression ring, the external wall of which, in cross section, may be described as forming the frustrum of a right cone. In other words, the peripheral edge of the ring or the flange contacting portion thereof represents a cross-sectional segment, or frustrum, of a right cone. Thus, in cross section, the circular flange portion is of greater external diameter at its upper edge than at the lower edge thereof. Such a construction enables the ring of this invention to tightly seal against the cylinder wall despite any so-called out-of-round or imperfection which may be developed through wear in the said wall. For example, it is known that through usage and by reason of piston slap or other causes, the upper portion of a cylinder in an internal combustion engine often wears to a slightly elliptical configuration. It is then spoken of as being "out-of-round." Ordinarily, and with usage of the common variety of expansion ring, such deterioration in the circular shape of the cylinder results in power and fuel losses for the normal expansion ring is inadequate to compensate for this imperfection. But the instant ring, having a substantial contact flange which in cross section represents the segment of a right cone, and which is relatively movable with respect to the one or more backing, expansion rings, functions so that this thin, contacting flange readily adapts itself to such irregular deformations of the cylinder wall.

Another object of the invention is to provide a two-part L-ring which not only lends itself to ease of large scale manufacture but also can be produced at a lower cost than rings of known types. This is because the sealing ring or the flange part of the two-part piston ring, not being spring loaded, can be manufactured of a variety of the cheaper metals. Furthermore, the method of manufacture is also simplified in that such flange, contacting portion of the ring can be rolled or turned or extruded or made in almost any appropriate manner. In addition, the one or more expansion rings which form the other part of the two-part arrangement can also be cheaply manufactured. This is because such rings, although spring loaded and made of the type of metal commonly found in the ordinary type of expansion ring, are much smaller than the latter. Of greater significance, such expansion rings need not be precision ground since they are merely employed to thrust against the inner surface of the flange part of the ring, and therefore are not required to, and do not, contact the cylinder wall. These two factors permit the assembly, even though it be a two or more part assembly, to be manufactured less expensively than the ordinary type of expansion ring which must be ground to fine tolerances and which, of course, requires considerably larger amounts of high grade and expensive metals than the type of expansion ring which is here contemplated.

A further object of the invention is the provision of a piston ring which, because of the lightness of contact of the flange part thereof with the cylinder wall, results in a substantial reduction in the amount of wear upon both piston ring flange and cylinder wall.

Another objective of the invention is to provide a ring that runs cooler, thus substantially reducing deposition of carbonaceous matter. This function is attained by the closer contact which is possible by the ring of this invention with the cylinder. Furthermore, much less friction is involved because of the comparatively light contacting pressure of the ring during the non-working strokes of the piston. The ring grooves being smaller and the involved clearances much less than those found in standard piston and ring structures, constant and uniform flow of heat out of the ring itself and into the piston necessarily maintains the ring, under operating conditions, at comparatively lower temperatures.

It is a further advantage of the instant invention that the flange-type ring hereof may be made of rolled steel; it is therefore not brittle and subject to fracture whereas it is well known that the usual ring, generally made of cast iron, is quite brittle, breaks easily, and must be handled with care.

And, finally, an important objective of the invention is the provision of a piston or sealing ring of the flange type which not only has great utility as a compression ring because the construction takes full advantage of the pressures against which a seal is to be maintained, but also has considerable utility as an oil ring when positioned upon the piston in an opposite direction. In addition, because of its greater sealing effect, the flange ring of this invention can take the place of two or three expansion rings of the ordinary type.

Other objectives and inherent advantages of the invention should be apparent from the following explanation thereof, wherein a preferred embodiment of this flange type piston ring is illustrated in the accompanying drawings. In these drawings.

It is to be understood that these drawings are largely diagrammatic in nature. This is particularly true in the representation of the clearances involved which, for explanatory purposes, are obviously greatly magnified. However, such drawings are intended to illustrate the preferred thinking as to the operation and functions of the piston ring of this invention.

Figure 1:
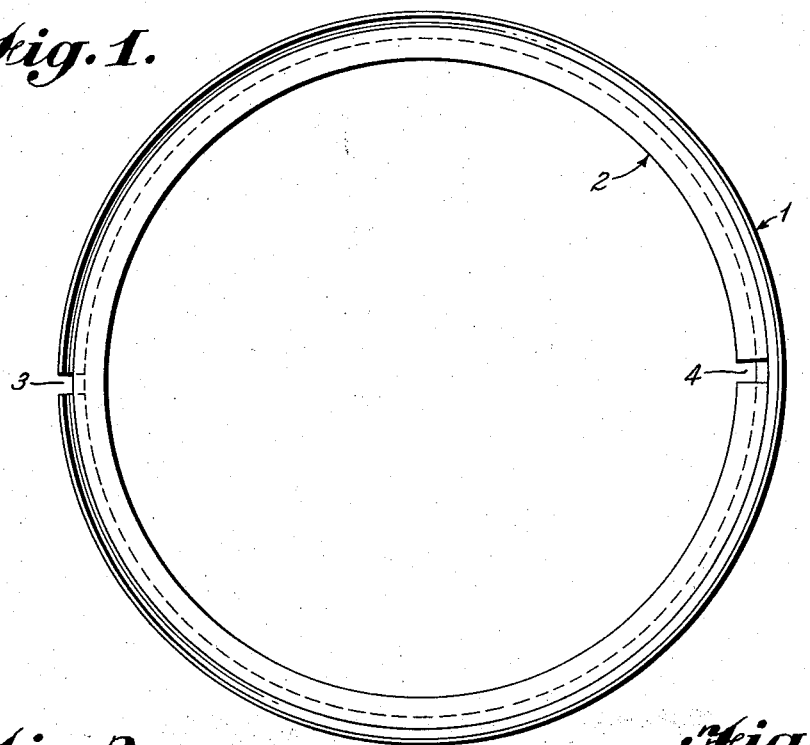
Figure 1 is a top plan view of the sealing ring comprising my invention, illustrating also the accompanying tension or expansion rings.

Referring more particularly to these drawings, it is seen that in Figure 1 the flange portion of the two-part ring is generally indicated at 1. The inner ring or rings, as the case may be, which are, in fact, expansion rings, are generally indicated at 2. Both the flange and expansion ring in each instance are straight cut, resulting in gaps 3 and 4. These are of predetermined dimension after fitting of the ring upon the piston and positioning the latter within the cylinder. In the instant case, since the unit is of two-part manufacture, such gaps 3 and 4 are oppositely located with respect to each other, as shown in Figure 1.

Figure 2:
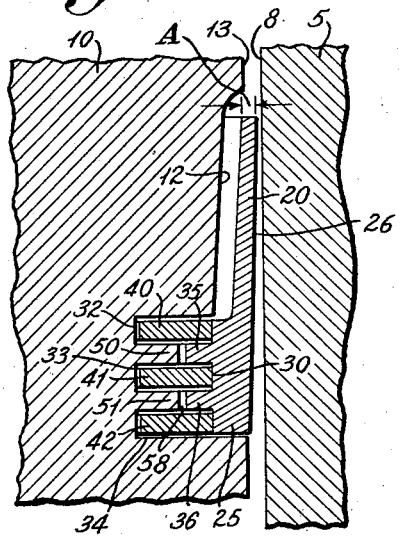
Figure 2 is an enlarged cross-sectional view of the two-part ring illustrating what might be termed its relaxed or non-pressurized position in a cylinder.
Figure 3:
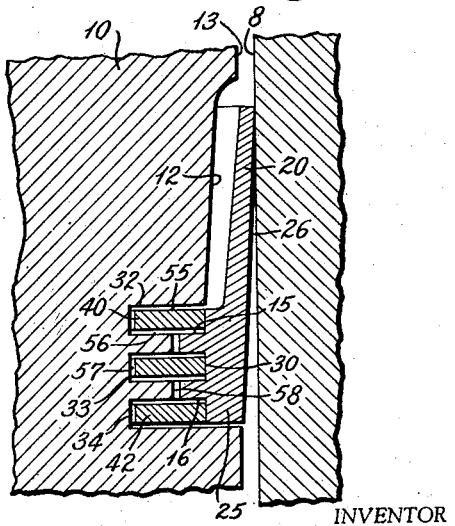
Figure 3 is a cross-sectional view, similar to Figure 2, but diagrammatically indicating the effect of gaseous pressures against the flange portion of the ring.

Referring to Figures 2 and 3, the cylinder housing 5 and the contacting cylinder wall 8 accommodate a piston 10, here partially shown. The piston is appropriately cut as at 12 to provide a space between the piston and the internal periphery of the L-shaped flange ring. The periphery 13 of the upper portion of the piston is also substantially spaced from the piston wall. Hence, it can be readily appreciated that combustion gases under pressure will flow unimpeded behind the flange of the ring to thrust such flange against the cylinder wall during the work and compression strokes of the cycle. The piston as here shown, is provided with three expansion ring grooves, 32, 33, 34, respectively, to receive three backing, expansion rings 40, 41 and 42 for the described purpose.

The L-shaped portion of the ring is comprised of an extended, resilient and upwardly positioned flange 20, made integral with the main body portion 25 of this part of the unit. This entire L-shaped portion has an external peripheral sealing face 26 adapted to tightly contact the cylinder wall 8.

The body portion 25 of the L-shaped part of the unit is, in this embodiment of the invention, grooved or flanged at its upper and lower edges as at 15 and 16, respectively. It is also provided with a middle groove 30. The purpose of the top and bottom inner flanges and the middle groove 30 is to receive the three expansion rings 40, 41 and 42, respectively. As stated, these expansion rings are far less in cross-sectional width and thickness than the ordinary type of expansion ring that is generally employed as a compression ring. Such individual expansion rings are spring loaded and, hence, constantly assert a uniform, outward mass action or thrust against the L-shaped flange portion of the unit and thus continuously and evenly urge the latter into sealing relationship with the cylinder wall 8.

The cutting of the flanges 15 and 16 on the lower portion of the contact ring results in two peripheral lands 35 and 36. The counterpart of these is found in the lands 50 and 51, formed by the referred to ring grooves 32, 33 and 34. These pairs of lands are oppositely positioned, as seen in Figures 2 and 3, will sufficient space or clearance 58 in between them to permit the required independence and flexibility of the contact or flange ring.

It should here be observed that in Figure 2, the flange ring is shown as slightly spaced from the cylinder wall 8. This is done in a somewhat diagrammatic manner to exemplify for illustrative purposes only the sealing flange of the ring in its relaxed position, i. e., without that portion being subject to the relatively high pressure of combustion gas. In order to further illustrate the tendency of such combustion gases to force the resilient flange portion of the unit against the cylinder wall, the top of the flange or the portion 20 is shown to be in tight and sealing contact with the cylinder wall 8 in Figure 3. Actually, since the two-part unit is one operating under the principle of tension rings which do exert the outward thrust referred to, the contacting portion of the unit or the flange 20 would always be in contacting relationship with the cylinder wall. The sealing effect, however, will be far greater under the influence of the high pressures of combustion gases. Hence, these two Figures 2 and 3, are showings intended to illustrate the effect of such gases in extending outwardly with greater force the upper portion 20 of the resilient flange ring.

Figure 5:
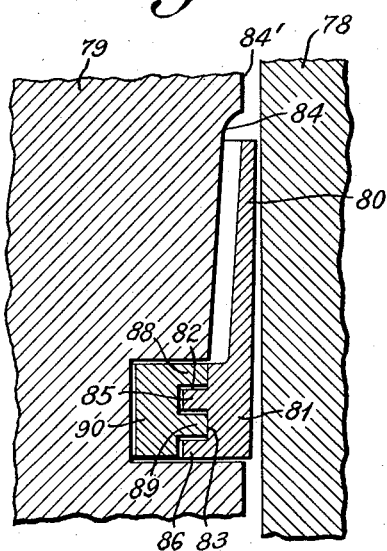
Figure 5 is a showing, similar to Figures 2 and 3, of a further embodiment of the invention.

There is another pertinent observation to be made with respect to the cross-sectional configuration of the flange part of the unit. The integral portions 20 and 25 of the flange ring form, as stated, a continuous sealing face 26. Explained with reference to a vertical axis through the piston, this face may be considered as being cut as the frustrum of a right cone. In other words, and as shown in Figures 2, 3 and 5, the contacting face 26 is slanted inwardly from top to bottom. Accordingly, and as shown in Figure 2, there is greater clearance between the face 26 and the cylinder wall 8 at the bottom of said face than there is at the top.

The reason for this cross-sectional configuration, i. e., forming the contacting face as the frustrum of a right cone, is to permit the sealing flange to be maintained in sealing relationship with the cylinder wall even after considerable wear upon the latter. As has been intimated above, it is well known that conditions of wear in internal combustion engines often produce, largely due to piston slap, a condition whereby the cylinder wall, particularly at its upper portion, becomes slightly elliptical or "out-of-round." In the use of normal expansion, compression rings, provided with perfectly flat, vertical, contacting faces, it is apparent that once an out-of-round condition exists, the ring is unable to accommodate such a deformity and hence to seal with proper efficiency. However, with the frustrum configuration here referred to, and taking into consideration also the high flexibility, independent movability and resilience of the flange part of this two-part ring, such out-of-round conditions due to wear are compensated for and, despite their presence, the flange of the ring will maintain its sealing efficiency.

With respect to the several tension rings, as shown in Figures 2 to 5, it is seen that their respective outer peripheral surfaces are in relatively tight contact with the bottom of each of appropriate grooves 15, 16 and 30, formed in the base portion of the flange part of the two-part unit. The involved side and back clearances where these tension rings fit into the piston can be relatively small and just sufficient to permit the required degree of flexibility of such rings under operating conditions. Hence, side clearances, such as those indicated at 55 and 56 can be of the order of from about ±.002 inches. The back clearance 32 can be of even greater amount, namely about ±.005 inches. The clearance 58 which exists between the pairs of projections, as for example, 35 and 50, or the lands on the lower portion of the flange and the projections or lands on the piston, can be that practical amount which will permit the required degree of flexible movement of the flange ring.

This close contact of the expansion rings with the flange portion of the device, the relatively small clearances involved between the ring grooves of the piston and the tension rings, and the tortuous course offered to high pressure combustion gases due to the seating of such tension rings in one or more grooves in the flange ring, are all factors contributing to a substantial and adequate seal preventing by-passing or back-flowing of the ignited gases under pressure around the rear portion of the flange ring or the several tension rings. As seen particularly in Figures 2 and 3, any such gases under pressure would have to travel a particularly tortuous course in order to by-pass the rear of the twin unit; in practical effect, blow-by around the rear or inner side of the unit is thus, to all practical purposes, substantially reduced if not eliminated.

Figure 4:
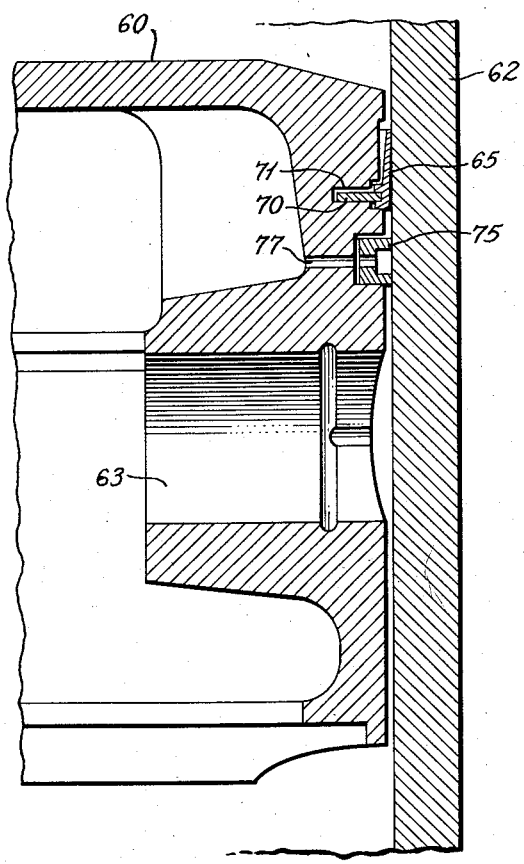
Figure 4 is a cross-sectional view of a modified version of the invention illustrating its use in conjunction with an oil ring.

The embodiment of Figure 4 is illustrative of the same two-unit type of device wherein the flange ring 65 at its lower portion is provided with a single inner groove to accommodate a single expansion or tension ring 70. The latter is seated in appropriate ring groove 71, provided in the usual type of piston 60, the latter of course being mounted within the cylinder 62. In this instance, the clearances are closer and tolerances more exact. As here shown, the compression flange ring 65 is utilized in conjunction with a usual type of oil ring 75 and the piston is provided with an oil drain opening 77. In this showing, the full length of the piston is illustrated and also the wrist pin bore 63 thereof.

In the embodiment of Figure 4, the same operative aspects of the two-part unit are present. The involved clearances should be somewhat closer so that it can readily be appreciated that even if one tension ring be employed, any blow-by would be prevented by the resultant tortuous course which would have to be followed by gases under pressure in order to circumvent the sealing effect of the flange ring 65. In this instance also, since the unit is a two-part unit, much greater flexibility is involved in the operation of the flange 65 for by seating the tension ring in the groove positioned in the flange part, the interconnection is sufficiently tight to prevent blow-by, but, on the other hand, sufficiently flexible to permit the required amount of independent movement of the flanged, sealing portion of the combination unit.

Similar comments are applicable to the further embodiment of the invention of Figure 5. Here, mounted within the cylinder wall 78, is the usual type of piston 79. The flange part of the two-part unit is again shown as having a long, flexible or extended lip 80, made integral with a lower body portion 81. This flange portion is diagrammatically indicated as being in its so-called relaxed position, and, again, the frustrum surface of the face of the lip or flange is quite noticeable. The lower portion 81 of this contact part of the unit is provided with a tension ring groove 83 that is surmounted by a right-angular, inner flange 82. Thus, there are two adjacent inner flanges 85 and 86, respectively, located upon the inner peripheries of the contact ring. This piston 79 is again cut away as at 84 and 84'. The resultant spaces or the resultant substantial clearances between the cylinder wall and the inner side of the flange 80 permit combustion gases to penetrate this area, as before explained. The tension ring 90 is also fabricated with two interfitting peripheral lands 88 and 89, one adapted to conform to the top groove 82 and the other projection or land 89 being adapted to fit the flange ring groove 83.

Having reference to the back and side clearances, the tolerances involved with respect to this type of tension ring are substantially the same as hereinbefore discussed. Furthermore, with the described interfitting flanged portions existing between the tension ring and the lower portion 81 of the contact ring, it is apparent that gaseous flow is prevented between the tension ring and the flange.

In addition, the possibility of blow-by is again substantially reduced by the relatively tortuous course or labyrinth which would have to be taken by any gases under the pressures here involved.

With the foregoing explanation, it should be appreciated that the cylinder contacting ring or the flange part of the unit should, at its upper peripheral portion or at the extremities 20, disclosed in Figures 2 and 3, be as thin as is practical in order to obtain particularly good pliability or flexibility thereof. The carrier or expansion rings can vary in their radial width; their strength can be whatever is desired but with reference to the size of the ring groove, it should be kept as narrow as is physically possible and spring loaded with just sufficient tension to bring the contact or flange ring against the surface of the cylinder wall.

It has been indicated in the foregoing that the overall expense of rings of the type of the invention would be less than the precision ground, normal type of compression ring; as already suggested, this is in part due to the smaller size of the several elements, particularly the tension rings which go into fabrication of this unit. Also, it is important that the flange part of the ring be quite thin in order to render it comparatively flexible.

In order to understand the comparative size of the unit of the instant invention, reference will now be made to certain preferred overall dimensions relating in particular to the preferred embodiment of the invention of Figures 2 and 3. The topmost part of the flange is indicated at A, Figure 2. This thickness A will approximate between from about .010 inch to about .015 inch. From top to bottom or considering the entire contacting face 26, the preferred length thereof is from about .250 inch to about .300 inch, depending upon the diameter of the piston. The tension rings themselves, rings 40, 41 and 42 in these figures, are preferably about .095 inch in radial width and about .020 inch in thickness. These dimensions of the tension rings are particularly applicable if such rings are fabricated of spring steel. From the dimensions thus given, it can be appreciated that the tension ring groove 30 in the lower portion of the flange ring would approximate .023 inch in width or .003±.002 inch greater than the thickness of the tension rings. The other complementary ring grooves in the piston itself are of comparable dimension. Also, in this embodiment, the cross-sectional overall width of the lower portion of the flange ring 25 and inclusive of the lower flanges 35 and 36 thereof would approximate .055 inch.

These same dimensions would, in general prevail in the embodiments shown in Figures 4 and 5 hereof, particularly with respect to the upper contacting portion of the resilient flange ring. It is not meant to be implied by the foregoing recitation of the comparative size of the unit of this invention that it must necessarily be confined thereto. Such size may be varied within practical limitations. However, it is important that the flange ring, of whatever dimension, be sufficiently thin throughout its approximately vertical length as to have an inherent flexibility—a factor necessary to proper performance of the ring under operating conditions.

With a two-part construction, as described above, it is to be appreciated that the contact or flange ring can readily adapt itself to the unavoidable deformations of the cylinder caused by heat and friction because, for one primary reason, it is connected with the tension rings in a movable and flexible fashion and does not have the rigidity of the latter. The flange ring can and preferably should be made of a different material than the carrying or expansion rings. For instance, the contact ring should be made of a material exhibiting lightness in weight yet providing a substantial wearing surface. On the other hand, the carrier or expansion rings can be made of a material of particularly great strength or good tension power without regard to any qualities of wear since they are out of contact with the cylinder wall.

It should further be noted that if the contact or flange ring is used in conjunction with several tension rings, the demands placed on the walls of the ring grooves are reduced by the involved mass forces because then carrier or tension rings of very small axial strength can be employed. Such a construction becomes particularly advantageous when light metal is used for the flange ring and where a spring steel is employed in fabrication of the carrier rings.

Not only does this two-part construction permit a high degree of flexibility and, hence, of tight, sealing contact of the flange ring. The further function thereof is a substantial reduction of wear in the contact ring due to the lightness of pressure exerted upon the side walls of the cylinder. Although carbon deposit has been a serious problem in all types of rings, that problem is substantially reduced in the use of the instant invention because of the substantial reduction in temperature of the ring during working conditions. This comes about because of these factors: the tension rings are in close interfitting contact with the flange ring; these several tension rings are also in relatively close contact with the piston and particularly in the preferred embodiment of the invention where several such tension rings are employed, it is at once apparent that the transmission of heat through the flange ring, tension rings and to the piston is greatly facilitated. This results in constant flow of heat from the exterior ring to the body of the piston. It also follows that the operating temperatures of the contact ring are substantially lower than would be expected and, operating under these lower temperature conditions, deposition of carbonaceous matter is substantially reduced. Also, as noted above, with less radial pressure being a factor, there is less frictional heat produced.

As many variations are possible within the scope of this invention, it is not intended that the same be limited in any manner except as defined by the appended claims.

I claim:

1. In a two-part piston ring unit, a cylinder wall contacting flange mounted upon a base portion, said base portion having an expansion ring receiving groove, and an expansion ring, the outer side of said expansion ring being adapted to be seated in said groove, said flange extending approximately right-angularly to said expansion ring, said flange being of such resilience as to flex responsively to the application of gaseous pressures thereto, a piston having an expansion ring groove, the inner side of said expansion ring being adapted to be received in said last-named expansion ring groove.

2. In a multiple component piston ring unit, a cylinder wall contacting flange and an expansion ring, said flange extending approximately right-angularly to said expansion ring, said flange graduating into a resilient tip portion, said tip portion being of sufficient flexibility to bend toward said wall upon the application of gaseous pressure thereto, said flange having at its lower portion at least one expansion ring receiving groove, the external periphery of said expansion ring being adapted to be seated in said groove, a piston having at least one expansion ring receiving groove, the inner side of said expansion ring adapted to be seated in said last-named groove, whereby said expansion ring forces said flange outwardly in sealing relationship with said cylinder wall in a flexible and independently movable manner.

3. In a multiple component piston ring unit, a cylinder wall contacting flange and an expansion ring, said flange extending approximately right-angularly to said expansion ring, said flange graduating into a flexible, resilient tip portion at the upper end thereof, the external surface of said flange having the configuration of the frustrum of a right cone, said flange having an enlarged lower portion provided with at least one expansion ring receiving groove having a plurality of inwardly extending hands, the external periphery of said expansion ring being adapted to be seated in said groove between at least two of said hands, a piston having at least one expansion ring receiving groove, the inner side of said expansion ring being adapted to be seated in said last named groove, whereby said expansion ring forces said flange outwardly in sealing relationship with said cylinder wall in a flexible and independently movable manner.

4. In a multiple piston ring assembly adapted to contact a cylinder wall of an internal combustion engine in sealing relationship, a piston having at least one expansion ring groove, an expansion ring seated in said groove, a cylinder wall contacting ring having a contour approximately L-shaped in cross section, said contacting ring having an upper portion comprising an elongated, resilient flange, said flange being of such material and thickness as to flex toward said wall upon the application of gaseous pressure to the inner side thereof, the lower portion of said contacting ring having at least one expansion ring groove, forming a plurality of inwardly extending lands, the external periphery of said expansion ring being adapted to fit in said last-named ring groove between two of said lands, thereby forming a tortuous course prohibiting the passage of combustion gases between said expansion ring and said lower portion, the external peripheral surface of said contacting ring having the contour of a frustrum of a right cone, whereby said contacting ring is positioned in independently movable and flexible relationship with said expansion ring and the said contour of the external surface of the contacting ring permits said ring to effectively seal against said cylinder wall despite irregularities of contour of said wall.

5. In a multiple piston ring assembly adapted to contact a cylinder wall of an internal combustion engine in sealing relationship, a piston having a plurality of expansion ring grooves, expansion rings seated in each of said grooves, a cylinder wall contacting ring having a contour approximately L-shaped in cross section, said contacting ring having an upper portion comprising an elongated, flexible flnage, the lower portion of said contacting ring having expansion ring grooves complementary to the said grooves in said piston, the external peripheries of said expansion rings being adapted to fit in said last-named ring grooves, the external peripheral surface of said contacting ring having the contour of a frustrum of a right cone, whereby said contacting ring is positioned in independently movable and flexible relationship with said expansion rings and the said contour of the external surface of the contacting ring permits said ring to effectively seal against said cylinder wall despite irregularities of contour of said wall.

References Cited in the file of this patent

UNITED STATES PATENTS 2,577,022     Lieberherr  --------------  Dec. 4, 1951